Dec. 11, 1945.   G. A. TINNERMAN   2,390,751
FASTENING DEVICE
Filed Nov. 2, 1943
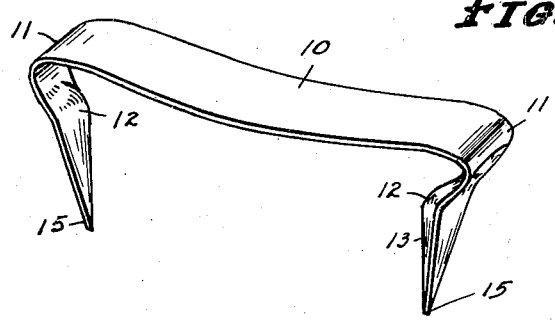
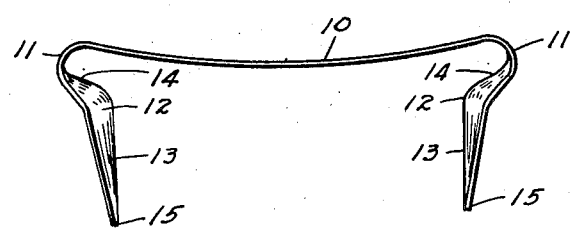
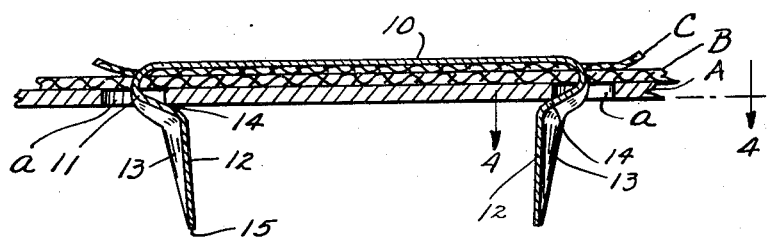
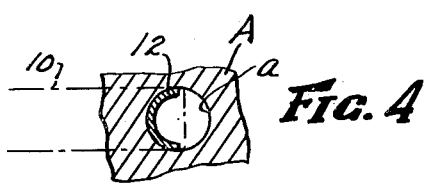
INVENTOR.
GEORGE A. TINNERMAN
BY
Bates, Teare, v McKean
ATTORNEYS Patented Dec. 11, 1945

2,390,751

UNITED STATES PATENT OFFICE 2,390,751

FASTENING DEVICE

George A. Tinnerman, Cleveland, Ohio, assignor to Tinnerman Products, Inc., Cleveland, Ohio, a corporation of Ohio.

Application November 2, 1943, Serial No. 508,665

4 Claims. (Cl. 24—153)

This invention relates to a fastening device in the general form of a staple adapted to secure a layer to a support in a very effective manner by the mere act of inserting the fastening device.

More particularly, my device provides a staple-like member having a body portion formed at its ends into two return bends from the inner ends of which two legs are formed which project away from the body. Such legs may be readily passed through a piece of fabric or other material to be secured and through openings in a support and will then engage the far side of the support by reason of the underhanging shoulders provided by the return bends of the fastener, whereby the parts are retained in place.

Another feature of the invention comprises the formation of the underhanging shoulders and the projecting legs as single integral concavo-convex members which have the necessary rigidity to hold themselves effectively in place while they are connected with the body by a region of sufficient flexibility to enable the ready insertion of the fastener legs.

My invention is hereinafter more fully explained in connection with a preferred embodiment illustrated in the drawing.

In the drawing, Fig. 1 is a perspective of my fastening device; Fig. 2 is a side elevation thereof; Fig. 3 is a longitudinal section of the fastener in place and securing layers to a support; Fig. 4 is a cross section through one of the legs of the fastener, as for instance in a plane indicated by the line 4—4 on Fig. 3.

Referring to the parts of the fastener by reference numerals, 10 indicates the body of the fastener, which is normally concavo-convex or curved slightly upwardly, using such direction with reference to the views in the drawing. The ends of the body 10 are provided with integral return bends 11, the lower ends of which are formed into downwardly extending legs 12. The under portion of the return bends and the downwardly extending legs are given a concavo-convex form with the concave side downwardly and outwardly, as indicated at 13 in the drawing, to stiffen these parts. The legs 12 are inwardly beveled at their edges so that they come to a point 15, Fig. 1.

Figs. 3 and 4 indicate, at A, a suitable support having openings $a$. B indicates one layer of fabric overlying the support and C a supplemental layer on the layer B. My fastener is adapted to be forced through the layers of fabric so that the legs pass through the openings $a$ and the shoulders 14 at the junction of the return bends and the downward legs engage the under corner of the support, as shown in Fig. 3.

The downward legs 12, hollowed into trough-shape by the concavo-convex formations 13, and having tapered edges causing the legs to come to a point 15 at the bottom, are quite rigid and at the same time are flexibly connected to the body by reason of the return bends 11, which are flat in cross section. Thus the pointed legs may be readily projected through one or more layers of material overlying the support without danger of distorting the legs, but when in place the under portion of the return bends 11 spring inwardly and by engaging the edges of the support serve to hold the fastener in place and the clamped material against the support.

The effective clamping described is insured by the concavo-convex portion of the body 10, which, when the body is flattened as is shown in Fig. 3, causes a continuous pressure against the clamped material toward the support. This normal concavo-convex form of the body, tending to pull the legs through the openings of the support, causes a tight engagement of the return bend shoulders against the under side of the support, as indicated at Fig. 3.

It will be seen that my fastener is of extremely simple construction and is designed to be readily made out of a single piece of resilient sheet material as, for example, spring steel. When formed it provides two individually stiff pointed legs adapted to be projected through the material to be clamped, such legs being flexibly carried by the return bends leading from the concavo-convex body, so that when in place the fastener maintains an engagement with the underside of the support adjacent the openings through which the legs have passed.

I claim:

1. A fastening device comprising a single strip of resilient sheet material having a body portion, integral return bends turning downwardly and inwardly at the opposite ends of the body portion and flexibly united thereto by both portions being flat at their junction, and legs projecting from the under ends of the return bends, the under portion of the return bends and the outer face of the legs being transversely bent to provide concavo-convex formations to rigidify the legs.

2. A fastening device comprising a single strip of resilient sheet material having a body portion of normally concavo-convex formation in a longitudinal direction while transversely straight in cross section, integral return bends at the opposite ends of the body portion extending across the convex face of the body, and legs projecting from the other ends of the return bends in a direction away from the body, the under portion of the return bends and the outer faces of the legs being transversely bent to provide merging concavo-convex formations with the edges downward on the return bends and outward on the projecting legs, whereby such parts are stiffened while the return bends provide effective shoulders to engage a support through which the legs may extend.

3. A fastening device made of a single strip of sheet material and comprising an elongated body having return bends at its ends and legs projecting from the other ends of the return bends, the return bends inclining from the body to the junction with the legs, to make the device self-centering when the return bends engage the inner edges of the openings through a support, the return bends being comparatively flexible where they join the body and comparatively rigid where they join the legs.

4. A fastening device comprising a single strip of resilient sheet material having an elongated body portion of normally concavo-convex longitudinal formation straight in cross section and integral return bends at the opposite ends of the body portion on the convex side thereof and legs projecting from the inner ends of the return bends and stiffened by being formed into substantial trough shape.

GEORGE A. TINNERMAN.